J. A. CALWELL.
FLEXIBLE JOINT FOR ROLLING MILL SPINDLES AND THE LIKE.
APPLICATION FILED SEPT. 2, 1916.
1,208,476. Patented Dec. 12, 1916.
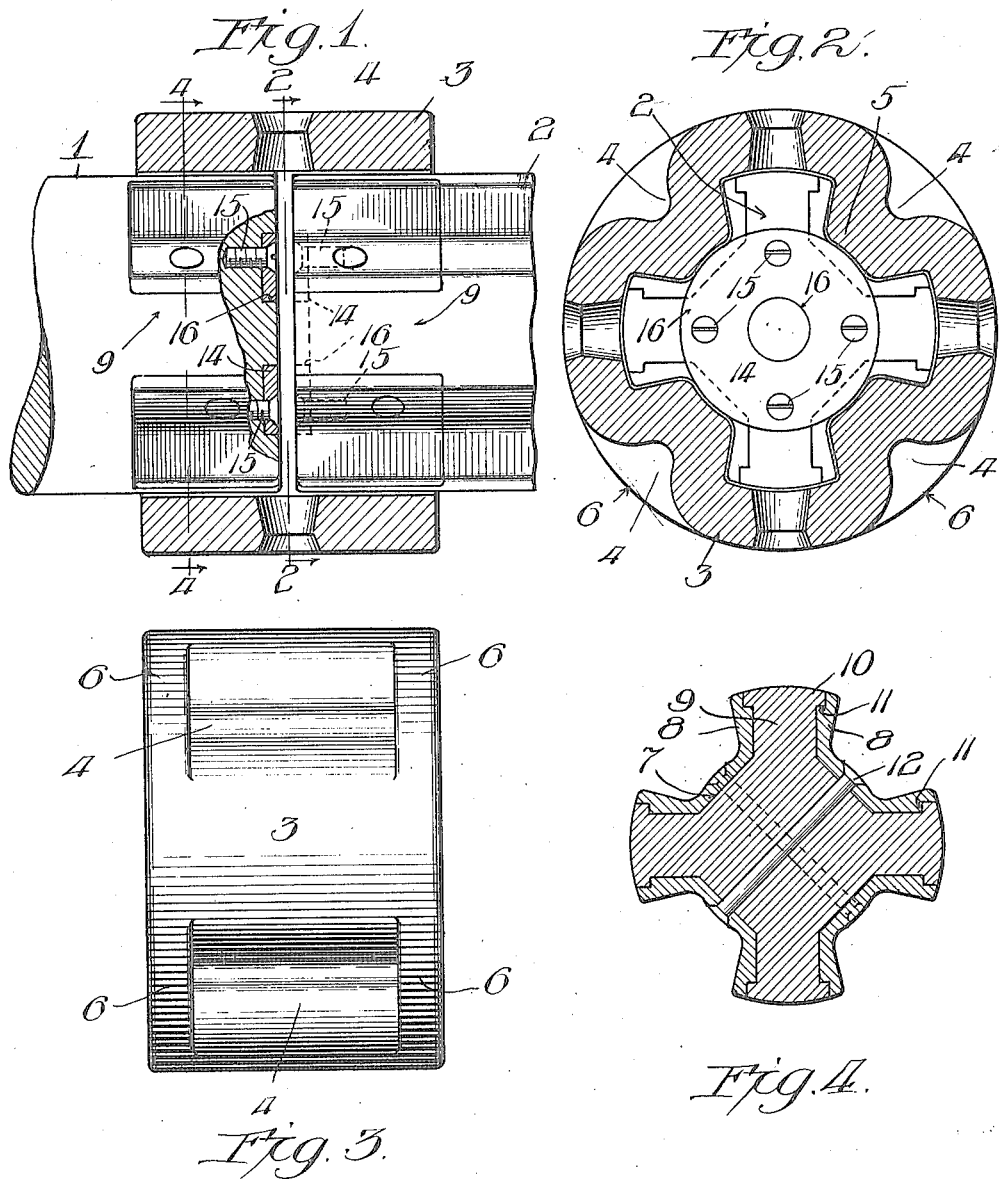

UNITED STATES PATENT OFFICE.

JOHN A. CALWELL, OF CHICAGO, ILLINOIS, ASSIGNOR OF ONE-HALF TO ARTHUR W. GLEASON, OF CHICAGO, ILLINOIS.

FLEXIBLE JOINT FOR ROLLING-MILL SPINDLES AND THE LIKE.

1,208,476.          Specification of Letters Patent.     Patented Dec. 12, 1916.

Application filed September 2, 1916. Serial No. 118,163.

*To all whom it may concern:*

Be it known that I, JOHN A. CALWELL, a citizen of the United States, residing at Chicago, county of Cook, State of Illinois, have invented a certain new and useful Improvement in Flexible Joints for Rolling-Mill Spindles and the like, and declare the following to be a full, clear, and exact description of the same, such as will enable others skilled in the art to which it pertains to make and use the same, reference being had to the accompanying drawings, which form a part of this specification.

The duty to which the flexible joints or couplings of rolling mills are subjected, whether it be a straight drive, or one requiring a universal joint, is extremely heavy and the maintenance cost correspondingly great. If the parts are made out of carbon steel they wear out very rapidly and if they are made entirely of a steel alloy they are very expensive.

The object of the present invention is to produce a construction of spindles and flexible couplings or joints which shall be but little more expensive than if made of carbon steel throughout and possess the strength of and even greater durability than those constructed entirely of a steel alloy.

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1 is an elevation of the adjacent ends of two spindles with the surrounding coupling box shown in section; Fig. 2 is a section taken on line 2—2 of Fig. 1; Fig. 3 is a side elevation of the coupling box; and Fig. 4 is a section taken on line 4—4 of Fig. 1 with the coupling box omitted.

In the drawing I have illustrated only a single form of coupling or joint and, for the sake of brevity, I shall confine the detailed description to this particular form, although it will of course be understood that my invention is not confined to devices having any particular contour but is applicable to any of the joints or couplings usually found in mills, regardless of their contour or the angles at which the connected spindles are placed relatively to each other.

Referring to the drawing, 1 and 2 represent two spindles each having a plurality of channels, in the present instance four, cut lengthwise of the same inwardly from the meeting ends; the portions of the spindles thus mutilated being surrounded by a coupling box, 3, shaped on the inside to follow the contour of the spindles and couple them together. As now made, the coupling boxes consist of portions thick or deep in the radial direction, namely those portions adapted to enter the channels in the spindles, alternating with relatively thin portions or, in other words, they consist of cylindrical shells or rings having longitudinally extending ribs projecting inwardly therefrom at intervals. The result is that the boxes are extremely rigid and therefore under sudden or heavy shocks they crack and break instead of yielding more or less and thus resisting the shock.

In accordance with my invention I so construct the coupling box that it is uniformly strong throughout and will act like a short heavy spring to absorb shocks instead of succumbing to them. To this end I shape the exterior of the coupling box as nearly as may be to conform to the inner wearing surface, producing channels or grooves, 4, in the outer surface in registration with the inwardly extending ribs, 5, thus producing a substantially uniform thickness of material at all points, much as would be the case if the box were made of a plain cylindrical shell pressed inwardly along longitudinal lines at intervals to provide the inwardly projecting ribs. The circular contour is preferably maintained at the ends of the box and to accomplish this flanges or lips, 6, are left at the ends of the recesses 4.

Instead of cutting the channels in the spindles so that the walls thereof will form the wearing surfaces, I cut the channels considerably deeper, as indicated at 7, so as to provide room in each for a thick U-shaped wearing plate, 8. The channels are so cut that each of the ribs or projections, 9, left between the same will have at its outer end a widened portion or head, 10, the side edges of which overhang the adjacent channels and engage with transverse shoulders, 11, on the wearing plates in such a manner that the wearing plates cannot move into or out of the channels in any direction except parallel with the axes of the spindles. In applying the wearing plates they must therefore be introduced from the ends of the spindles in directions parallel with the axes of the latter, this being accomplished under heavy pressure. After the wearing plates are in position, rivets, 12, may be passed through the same and through the spindles to prevent their removal. After the wearing plates are in position, a holding plate or disk, 14, is placed on the extreme end of the spindle, being held in place by means of bolts or screws, 15, and by welding it to the body portion of the spindle; the disk or plate being made large enough in diameter to overlap the ends of the wearing plates. The disks or plates, 14, are preferably counter-sunk into the ends of the spindles in recesses, as indicated at 16. It will thus be seen that the wearing plates are not only held firmly against shifting bodily and becoming loose but they are also supported at their edges in such a way that there is little opportunity for metal thereof to flow and distort the working faces.

The spindles may be made of carbon steel or of any material which possesses properties of toughness and strength although perhaps totally unsuited for taking the wear imposed upon the working surfaces in the joint or coupling; the wearing plates may be made of a material especially suited for resisting the wearing action of the joint, mechanical strength being given by the surrounding spindle material; and the coupling box may be made of material which combines toughness, strength and wearing qualities.

The material for each part of the apparatus is therefore selected because of its fitness for the work it has to do, and the use of an expensive alloy for the body portions of the spindles, for which ordinary carbon steel will serve, is avoided. I am therefore enabled to produce an apparatus of low cost, and of great strength and durability.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In combination, two spindles arranged end to end and each having longitudinal channels distributed about the periphery thereof at the end adjacent to the other spindle, and a coupling box in the form of a shell of approximately uniform thickness surrounding said ends and provided with interior ribs to enter said channels.

2. In combination, two spindles arranged end to end and each having longitudinal channels distributed about the same at the end adjacent to the other spindle, and an inherently resilient coupling shell surrounding said ends and having parts extending into said channels.

3. A spindle having longitudinal undercut channels distributed about the same at the end thereof, and U-shaped wearing plates fitting into said channels.

4. A spindle having longitudinal undercut channels distributed about the same at the end thereof, and U-shaped wearing plates fitting into said channels, the parts being so proportioned that a considerable thickness of metal in the wearing plates extends outwardly to the periphery of the spindle.

5. A spindle having longitudinal undercut channels distributed about the same at the end thereof, U-shaped wearing plates fitting in said channels, and a holding plate secured to the end face of the spindle and extending outwardly a sufficient distance to overlie the outer ends of the wearing plates.

6. A spindle having longitudinal undercut channels distributed about the same at the end thereof, U-shaped wearing plates fitting in said channels, and a holding plate welded to the end face of the spindle and extending outwardly a sufficient distance to overlie the outer ends of the wearing plates.

7. A spindle having longitudinal undercut channels distributed about the same at the end thereof, U-shaped wearing plates fitting into said channels, and rivets extending through said wearing plates and through the spindle.

8. A spindle having longitudinal undercut channels distributed about the same at the end thereof, U-shaped wearing plates fitting into said channels, rivets extending through said wearing plates and through the spindle, and a holding plate welded on the end face of the spindle and overlapping the ends of the wearing plates.

In testimony whereof, I sign this specification.

JOHN A. CALWELL.